United States Patent Office 2,884,418
Patented Apr. 28, 1959

2,884,418
19 NOR SPIROSTATRIENE AND SPIROSTATETRAENE INTERMEDIATES

Franz Sondheimer and George Rosenkranz, Mexico City, Mexico, assignors to Syntex S.A., Mexico City, Mexico, a corporation of Mexico No Drawing. Application December 17, 1954
Serial No. 476,071

11 Claims. (Cl. 260—239.55)

The present invention relates to novel cyclopentanophenanthrene derivatives and to a novel process for the production thereof.

More particularly the present invention relates to a novel process for the production of the known hormone intermediate 3-hydroxy-17-acetyl-$\Delta^{1,3,5(10),16}$-estratetraene and/or the methyl or other lower alkyl esters thereof as well as to novel steroid intermediates for the production of these compounds.

The final product of the novel process of the present invention, i.e., the lower alkyl ethers of 3-hydroxy-17-acetyl-$\Delta^{1,3,5(10),16}$-estratetraene upon hydrogenation in the presence of a palladium on charcoal catalyst gives the known compound 3-methoxy-17-acetyl-$\Delta^{1,3,5(10)}$-estratriene which is an important starting compound for the production of the potent progestational hormone 19-nor progesterone as disclosed in detail in U.S. patent application Serial No. 250,036, filed October 5, 1951, now Patent No. 2,759,951, issued Aug. 21, 1956. Further, the lower alkyl ethers of 3-hydroxy-17-acetyl-$\Delta^{1,3,5(10),16}$-estratetraene are valuable intermediates for the production of 19-nor cortical hormones containing a 17α-hydroxy group such as 19-nor-17α-hydroxyprogesterone since they may be treated with an alkaline peroxide to introduce an oxido group, thus giving rise to the intermediate 16α,17α-oxido-3-methoxy-17-acetyl-$\Delta^{1,3,5(10)}$-estratriene described in U.S. patent application Serial No. 425,310, filed April 23, 1954, now Patent No. 2,781,365 issued February 12, 1957.

In accordance with the present invention there has been provided a novel method for the production of 3-hydroxy-17-acetyl-$\Delta^{1,3,5(10),16}$-estratetraene and/or the lower alkyl ethers thereof starting from the readily available $\Delta^{1,4,6}$-22a-spirostatrien-3-one. There has further been discovered in accordance with the present invention the novel compounds 19-nor-$\Delta^{1,3,5(10),6}$-22a-spirostatetraen-3-ol and derivatives thereof, as well as 19-nor-$\Delta^{1,3,5(10)}$-22a-spirostatrien-3-ol and derivatives thereof, all of these compounds constituting novel intermediates.

The process of the present invention may be exemplified by the following equation:

In the above equation R represents a lower alkyl group such as the methyl group.

In practicing the process above outlined $\Delta^{1,4,6}$-22a-spirostatrien-3-one, prepared in accordance with the process of U.S. Patent No. 2,676,174, was subjected to aromatization indicated in the first step of the foregoing equation. For the aromatization the steroid starting compound was dissolved in mineral oil or tetralin and passed through a glass tube, provided with a suitable packing such as Pyrex helices, and heated to an elevated temperature of the order of 600° C. The resultant mineral oil solution of 19-nor-$\Delta^{1,3,5(10),6}$-22a-spirostatetraen-3-ol was thereafter passed through a column containing alumina and the mineral oil removed from the column with hexane. Thereafter elution with less polar solvents such as hexane-benzene removed the unchanged starting material and then solvent mixtures such as benzene-ether removed a fraction containing the desired product. Recrystallization of the product of the last extraction gave the solid crystalline 19-nor-$\Delta^{1,3,5(10),6}$-22a-spirostatetraen-3-ol as well as an oily mother liquid which could be used in the next step of the process.

For the production of the esters of 19-nor-$\Delta^{1,3,5(10),6}$-22a-spirostatetraen-3-ol the free compound was conventionally esterified as with an acid anhydride in the presence of pyridine or by the use of an acyl chloride. By these conventional esterification methods esters of the aforementioned tetraen with hydrocarbon carboxylic acids, particularly those of acids of less than about 10 carbon were prepared. These included the simple aliphatic esters such as the acetate or propionate or butyrate, aromatic acids such as the benzoate, etc.

For the second step of the previously outlined process, the crystalline product and the oily mother liquor were each subjected separately to hydrogenation in the presence of a hydrogenation catalyst. The preferred catalyst was a palladium catalyst, for example, a 5% palladium on charcoal catalyst. Preferably the starting material was dissolved in an organic solvent such as ethyl acetate and subjected to hydrogenation at room temperature for a long period of time, i.e., of the order of 12 hours. After suitable purification the resultant product was 19-nor-$\Delta^{1,3,5(10)}$-22a-spirostatrien-3-ol. The free compound thus produced could then be conventionally esterified as set forth previously herein in the case of the product of the first step of the instant process. Most desirably in order to protect the hydroxyl group at C–3, however, for subsequent oxidative degradation indicated in summary as the third step of the instant process it was desirable to form

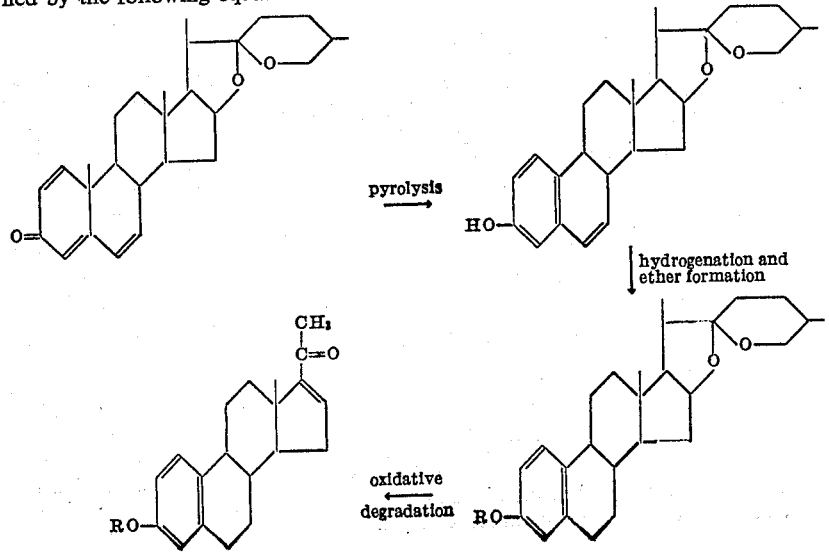

the lower alkyl ether, preferably the methyl ether, by reaction with a corresponding lower alkyl sulphate.

The resultant methyl ether, i.e., 3-methoxy-19-nor-$\Delta^{1,3,5(10)}$-22a-spirostatriene was then subjected to oxidative degradation, a preferred method involving the reaction with acetic anhydride, at approximately 200° C. to form the corresponding $\Delta^{20(22)}$-furostane derivative, followed by oxidation of this furostane derivative with chromic acid to form the corresponding diosone, and finally the hydrolysis of the diosone to form the novel corresponding 3-lower alkoxy-17-acetyl-$\Delta^{1,3,5(10),16}$-estratetraene. These last compounds on selective hydrogenation in the presence of a hydrogenation catalyst in a similar manner to that described in connection with the second step of the instant process, gave the known intermediate 3-lower alkoxy-17-acetyl-$\Delta^{1,3,5(10)}$-estratriene.

The following specific examples serve to illustrate but are not intended to limit the present invention:

*Example I*

A solution of 136 g. of $\Delta^{1,4,6}$-22a-spirostatrien-3-one in 8 lt. of mineral oil was passed at a rate of approximately 2 cc. per second through a glass tube (32 x 3 cm.) packed with Pyrex glass helices and heated to 600° C. The cooled solution was then passed through a column with 2.6 kg. of ethyl acetate washed alumina and the mineral oil was removed from the column by washing with 6 lt. of hexane. Elution with hexane-benzene and with benzene yielded 4.8 g. of unchanged starting material, while the subsequent fraction eluted from the column with mixtures benzene-ether afforded 82.8 g. of semi-solid fractions which after crystallization from acetone-hexane and then from hexane gave 16.2 g. of 19-nor-$\Delta^{1,3,5(10),6}$-22a-spirostatetraen-3-ol, M.P. 221–224° C., and 70.4 g. of oily mother liquors. The analytical sample had the following characteristics: M.P. 231–233° C., and $[\alpha]_D$ —202° (chloroform); λ max. 222 mμ (log ε 4.50), 262 mμ (log ε 4.00) and 304 mμ (log ε 3.44). The crystalline fraction and the oily mother liquors were subjected separately to the process of hydrogenation described in Example II.

From the crystalline compound we prepared its acetate by routine methods (heating in a mixture of acetic anhydride and pyridine for 1 hr. on the steam bath), and it had the following characteristics: M.P. 202–204° C., $[\alpha]_D$ —186° (chloroform).

Other esters of 19-nor-$\Delta^{1,3,5(10),6}$-22a-spirostatetraen-3-ol are prepared by reacting 19-nor-$\Delta^{1,3,5(10),6}$-22a-spirostatetraen-3-ol with acid anhydrides according to the above described acylation procedure or by conventionally utilizing the corresponding acyl halides. These esters include esters of hydrocarbon carboxylic acids of less than 10 carbon atoms derived from saturated or unsaturated, aliphatic, carbocyclic, or cycloaliphatic, aryl, arylalkyl, alkaryl, mono, di or polycarboxylic acids which form ester groups such as for example formyloxy, propionoxy, dimethyl-acetoxy, trimethylacetoxy, butyryloxy, valeryloxy, benzoxy, phenylacetoxy, toluoyloxy, cyclopentyl-formoxy, acryloxy and the esters of dicarboxylic acids such as succinic, glutaric and adipic.

*Example II*

One gram of the crystalline tetraene obtained in accordance with Example I (M.P. 221–224° C.) was dissolved in 50 cc. of ethyl acetate and then hydrogenated for 12 hours in the presence of 0.3 g. of 5% palladium-on-charcoal catalyst, at atmospheric pressure and room temperature. The catalyst was filtered, the solvent was evaporated and the residue was crystallized from acetone, thus giving 0.82 g. of 19-nor-$\Delta^{1,3,5(10)}$-22a-spirostatriene-3-ol with M.P. 245–247° C., $[\alpha]_D$ —19° (chloroform); λ max. 280 mμ (log ε 3.40).

Similarly, the oily mother liquors (76.4 g.), obtained in accordance with Example I, were dissolved in 1 lt. of ethyl acetate and hydrogenated for 12 hr. at room temperature and under 50 p.s.i. pressure in the presence of 10 g. of 5% palladium on charcoal catalyst. After filtration of the catalyst and evaporation to dryness, the residue was chromatographed in a column of ethyl acetate washed alumina, thus affording an additional 11.2 g. of 19-nor-$\Delta^{1,3,5(10)}$-22a-spirostatrien-3-ol.

The corresponding esters of this compound were prepared in the same conventional manner as set forth in Example I in connection with the free alcohol there obtained.

*Example III*

A boiling solution of 2.5 g. of 19-nor-$\Delta^{1,3,5(10)}$-22a-spirostatrien-3-ol in 250 cc. of methanol was treated alternatively with two portions of 20 cc. of a 50% solution of potassium hydroxide and two portions of 20 cc. of methyl sulphate. The solution was refluxed for 1 hr. and after cooling it was treated with 25 cc. of concentrated ammonium hydroxide solution. The precipitated methyl ether was collected and well washed with water to give 1.02 g., M.P. 146–152° C. After dilution of the filtrate with aqueous acetic acid, there was recovered 1.4 g. of unchanged starting material with M.P. 230–238° C. Crystallization from hexane gave the 3-methoxy-19-nor-$\Delta^{1,3,5(10)}$-22a-spirostatriene with M.P. 153–155° C., $[\alpha]_D$ —28° (chloroform).

*Example IV*

A mixture of 1.35 g. of 3-methoxy-19-nor-$\Delta^{1,3,5(10)}$-22a-spirostatriene and 20 cc. of acetic anhydride was heated in a sealed tube at 195–200° C. for 8 hours. After cooling the tube, the solution was poured into water, extracted with ether and the ether solution was washed with sodium carbonate solution, dried and evaporated to dryness. The oily residue (1.3 g.), without further purification, was dissolved in a mixture of 15 cc. of acetic acid, 10 cc. of ethylene dichloride and 4 cc. of water and the mixture was heated until all dissolved. The mixture was cooled to 15° C. and treated dropwise and under mechanical stirring with a solution of 0.4 g. of chromic anhydride in 0.6 cc. of water and 6 cc. of acetic acid. After finishing the addition the flask was stoppered and kept for 2 hrs. at room temperature. It was then poured into water and the ethylene dichloride layer was separated by decantation. The aqueous layer was extracted with chloroform and the combined chloroform and ethylene dichloride solution was washed several times with water, dried and evaporated to dryness. The residue was refluxed for 35 minutes with 1 g. of potassium bicarbonate, 1 cc. of water and 150 cc. of methanol. After dilution with water the product was extracted with ethyl acetate, the solution was washed to neutral and concentrated to a small volume, thus yielding 0.36 g. of 3-methoxy-17-acetyl-$\Delta^{1,3,5(10),16}$-estratetraene with M.P. 193–194° C., $[\alpha]_D$ +115°, λ max. 230 mμ (log ε 4.19).

We claim:

1. A process for the production of a 3-lower alkoxy-17-acetyl-$\Delta^{1,3,5(10),16}$-estratetraene which comprises heating $\Delta^{1,4,6}$-22a-spirostatrien-3-one to a temperature of approximately 600° C. in the presence of mineral oil to form 19-nor-$\Delta^{1,3,5(10),6}$-22a-spirostatetraen-3-ol, selectively hydrogenating the last mentioned compound to form 19-nor-$\Delta^{1,3,5(10)}$-22a-spirostatrien-3-ol, forming the lower alkyl ether of the last mentioned compound to protect the 3-hydroxy group thereof by reaction with a lower alkyl sulfate and subjecting the lower alkyl ether to oxidative degradation by reaction with an acetic anhydride at approximately 200° C. followed by oxidation with chromic acid and hydrolysis with sodium bicarbonate.

2. A process for the production of 19-nor-$\Delta^{1,3,5(10)}$-22a-spirostatrien-3-ol which comprises heating $\Delta^{1,4,6}$-22a-spirostatrien-3-one to a temperature of approximately 600° C. in the presence of mineral oil to form 19-nor-$\Delta^{1,3,5(10),6}$-22a-spirostatetraen-3-ol, and hydrogenating the last mentioned compound in the presence of a palladium on charcoal catalyst.

3. A process for the production of a C-3 lower alkyl ether derivative of 3-hydroxy-17-acetyl-$\Delta^{1,3,5(10),16}$-estratetraene which comprises forming a C-3 lower alkl ether derivative capable of protecting the 3-hydroxy group of 19-nor-$\Delta^{1,3,5(10)}$-22a-spirostatrien-3-ol by reaction with a lower alkyl sulfate and subjecting the derivative to oxidative degradation by reaction with an acetic anhydride at approximately 200° C. followed by oxidation with chromic acid and hydrolysis with sodium bicarbonate.

4. The process of claim 3 wherein the ether derivative is the methyl ether.

5. A new compound selected from the class consisting of 19-nor-$\Delta^{1,3,5(10),6}$-22a-spirostatetraen-3-ol and hydrocarbon carboxylic acid esters of less than 10 carbon atoms thereof.

6. 19-nor-$\Delta^{1,3,5(10),6}$-22a-spirostatetraen-3-ol.

7. The acetate of 19-nor-$\Delta^{1,3,5(10),6}$-22a-spirostatetraen-3-ol.

8. A new compound selected from the class consisting of 19-nor-$\Delta^{1,3,5(10)}$-22a-spirostatrien-3-ol, the lower alkyl ethers thereof and the hydrocarbon carboxylic acid esters of less than 10 carbon atoms thereof.

9. 19-nor-$\Delta^{1,3,5(10)}$-22a-spirostatrien-3-ol.

10. The lower alkyl ethers of 19-nor-$\Delta^{1,3,5(10)}$-22a-spirostatrien-3-ol.

11. The methyl ether of 19-nor-$\Delta^{1,3,5(10)}$-22a-spirostatrien-3-ol.

References Cited in the file of this patent

UNITED STATES PATENTS 2,676,174   Rosenkranz ------------ Apr. 20, 1954

OTHER REFERENCES

Sondheimer: J. Am. Chem. Soc., vol. 76, April 20, 1954.